J. W. HOWARD.
Subsoil Plows.
No. 136,726.          Patented March 11, 1873.
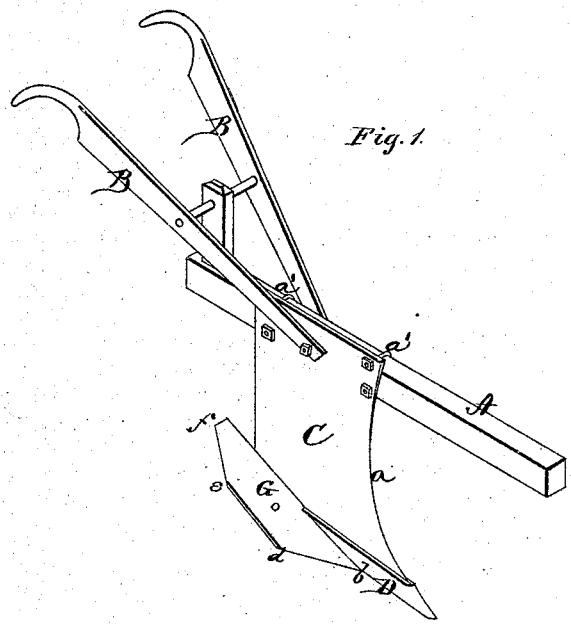
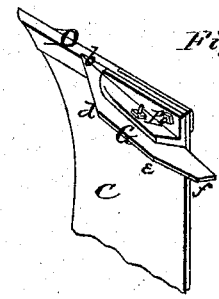
Witness:
Henry N. Miller
C. L. Ewert
Inventor.
John W. Howard
per
Alexander Mason
Attorneys.

UNITED STATES PATENT OFFICE.

JOHN W. HOWARD, OF GREENVILLE, ALABAMA.

IMPROVEMENT IN SUBSOIL-PLOWS.

Specification forming part of Letters Patent No. 136,726, dated March 11, 1873.

*To all whom it may concern:*

Be it known that I, JOHN W. HOWARD, of Greenville, in the county of Butler and in the State of Alabama, have invented certain new and useful Improvements in Subsoil-Plow; and do hereby declare that the following is a full, clear, and exact description thereof, reference being had to the accompanying drawing and to the letters of reference marked thereon making a part of this specification.

The nature of my invention consists in the construction and arrangement of a "subsoil-plow," as will be hereinafter more fully set forth.

In order to enable others skilled in the art to which my invention appertains to make and use the same, I will now proceed to describe its construction and operation, referring to the annexed drawing, in which—

Figure 1 is a perspective view of my entire plow; and Fig. 2 is a perspective view from the bottom of the plow.

A represents an ordinary plow-beam, provided with handles B B. C represents a plate of suitable dimensions attached to the side of the beam A by curved bolts $a'$ $a'$ and nuts, or other suitable and convenient means. The front edge of the plate C is curved and sharpened to form a cutting-edge, $a$. Along the lower edge of the plate C is welded a strip, D, and on the outer side of plate or blade at the lower edge, on the rear portion, is secured by bolts a rest, E, the upper face of which is inclined, as shown. To the upper side of this rest is secured the wing G. The inner edge of this wing rests against the blade, and the cutting-edge from $b$ to $d$ is inclined, the edge from $d$ to $e$ is parallel with the inner edge, and the edge from $e$ to $f$ is inclined so as to make the wing gradually narrower in rear of the blade C.

It will readily be seen that the wing G lifts up and pulverizes the soil as it passes along; and as it is attached to the rear part of the blade C, or, in other words, the forward point $b$ of the wing is in rear of the cutting-edge $a$ of the blade, it does not enter the soil until the furrow-slice is already cut off by the sharp front edge of the blade, so that little resistance is met with in penetrating and lifting the soil. That part of the subsoil or bottom of the furrow-slice which passes over the wing G near the blade C is kept elevated by the longer projection of the wing on that side, while that which passes over the opposite or outer side falls from the shorter projection and spreads and fills up the furrow under the former, which is finally left elevated several inches above its original position. Thus a portion of the lower stratum of subsoil is brought so near the surface that the subsequent plowings for the preparation in planting and in cultivating the crop will stir and mix it with the surface soil. The strip D, being welded to the blade C, while it gives substance to the point of the plow, also covers the joint between the wing and the blade, and shields the point of the wing, thereby preventing particles of dirt or other matter from wedging between and separating them.

Having thus fully described my invention, what I claim as new, and desire to secure by Letters Patent, is—

1. The wing G, constructed as shown and described, and attached to the blade C so that the point of the wing will be nearly in rear of the cutting-edge of the blade, substantially as and for the purposes herein set forth.

2. The combination of the plate C, strip D, rest E, and wing G, all constructed and arranged substantially as and for the purposes herein set forth.

In testimony that I claim the foregoing I have hereunto set my hand this 21st day of January, 1873.

J. W. HOWARD.

Witnesses:
P. R. DEVANE,
SETH S. MAY.